(12) United States Patent
Sodagar

(10) Patent No.: US 11,516,628 B2
(45) Date of Patent: Nov. 29, 2022

(54) MEDIA STREAMING WITH EDGE COMPUTING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/488,049

(22) Filed: Sep. 28, 2021

(65) Prior Publication Data

US 2022/0240061 A1 Jul. 28, 2022

Related U.S. Application Data

(60) Provisional application No. 63/142,384, filed on Jan. 27, 2021.

(51) Int. Cl.
| | | |
|---|---|---|
| *G06F 15/16* | (2006.01) | |
| *H04W 4/20* | (2018.01) | |
| *H04W 4/50* | (2018.01) | |
| *H04W 4/02* | (2018.01) | |
| *H04L 67/1008* | (2022.01) | |
| *H04L 67/63* | (2022.01) | |

(52) U.S. Cl.
CPC ........... *H04W 4/20* (2013.01); *H04L 67/1008* (2013.01); *H04L 67/63* (2022.05); *H04W 4/023* (2013.01); *H04W 4/50* (2018.02)

(58) Field of Classification Search
None
See application file for complete search history.

(56) References Cited

U.S. PATENT DOCUMENTS

| | | |
|---|---|---|
| 2020/0404069 A1 | 12/2020 | Li et al. |
| 2021/0007166 A1 | 1/2021 | Liao et al. |
| 2021/0075892 A1* | 3/2021 | Chun .................... H04L 69/163 |
| 2021/0320955 A1* | 10/2021 | Kolan ................. H04L 65/1026 |

OTHER PUBLICATIONS

3rd Generation Partnership Project; Technical Specification Group Services and System Aspects;5G Media Streaming (5GMS); General description and architecture, (Release 16), 3GPP TS 26.501 v16.6.1, Jan. 2021, Technical Specification (79 pages).

(Continued)

*Primary Examiner* — Wing F Chan
*Assistant Examiner* — Andrew Woo
(74) *Attorney, Agent, or Firm* — ArentFox Schiff LLP

(57) ABSTRACT

Aspects of the disclosure provide methods and apparatuses for 5G media streaming. In some examples, a user device includes processing circuitry. The processing circuitry sends a request from a 5G media streaming (5GMS) service client of the user device to a 5GMS application function for a 5G data network. The request can request for a 5GMS service. The processing circuitry then receives an acknowledgement from the 5GMS application function with information of a 5GMS application server that is instantiated by an edge application server. Then, the processing circuitry can perform the 5G media streaming based on the information of the 5GMS application server.

19 Claims, 10 Drawing Sheets

(56) References Cited

OTHER PUBLICATIONS

3$^{rd}$ Generation Partnership Project; Technical Specification Group Services and System Aspects; Architecture for enabling Edge Applications; (Release 17), 3GPP TS 23.558 v1.2.0, Nov. 2020, Technical Specification (142 pages).
3$^{rd}$ Generation Partnership Project; Technical Specification Group Services and System Aspects; Architecture for enabling Edge Applications; (Release 17), 3GPP TS 23.558 v1.2.0, Nov. 2020, Technical Specification (131 pages).
International Search Report and Written Opinion dated Jan. 12, 2022 in Application No. PCT/US21/52906.

* cited by examiner

MEDIA STREAMING WITH EDGE COMPUTING

INCORPORATION BY REFERENCE

This present application claims the benefit of priority to U.S. Provisional Application No. 63/142,384, "A METHOD FOR EDGE RESOURCE DISCOVERY, MANAGEMENT AND PROCESSING SUPPORT IN 5G MEDIA STREAMING" filed on Jan. 27, 2021. The entire disclosure of the prior application is hereby incorporated by reference in its entirety.

TECHNICAL FIELD

The present disclosure describes embodiments generally related to edge computing in media streaming.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various media applications and services require significant processing capability. In some examples, a cloud processing is preferred where workloads that otherwise would have been performed on a client device, can be offloaded to remote servers. Because the remote servers have much higher computation capacity, complex media processing tasks can be performed by the remote servers and then final results or near-to-final results can be sent to the client device.

Edge computing provides a network architecture that enables deployment of cloud computing services to be close to user equipment. Edge computing can achieve lower latency, higher bandwidth, and reduced backhaul traffic.

SUMMARY

Aspects of the disclosure provide methods and apparatuses for 5G media streaming (5GMS). In some examples, a user device includes processing circuitry. The processing circuitry sends a request from a 5GMS service client of the user device to a 5GMS application function for a 5G data network. The request can request for a 5GMS service. The processing circuitry then receives, an acknowledgement from the 5GMS application function with information of a 5GMS application server that is instantiated by an edge application server. Then, the processing circuitry can perform the 5G media streaming based on the information of the 5GMS application server.

In some examples, the edge application server can be selected based on at least one of a location of the user device, a location of the edge application server and capabilities of the edge application server.

In some examples, the processing circuitry sends the request in response to a media request from a 5GMS aware application in the user device.

In some examples, the processing circuitry sends the request via an interface of an edge enabler client of the 5GMS service client with an edge enabler server in the 5GMS application function.

In some examples, the edge application server is determined by the edge enabler server. In an example, the edge enabler server determines the edge application server based on filtering information in the request. In another example, the edge enabler server determines the edge application server based on the location of the user device. In another example, the edge enabler server determines the edge application server based on an acknowledgement from the edge application server that is in response to a discovery request from the edge enabler server.

In some examples, the 5GMS application function requests the edge application server to instantiate the 5GMS application server and request the 5GMS application server to provide the 5GMS service.

According to some aspects of the disclosure, processing circuitry for a 5GMS application function in a 5G data network can receive a request for a 5GMS service. The processing circuitry for the 5GMS application function can request an edge application server to instantiate a 5GMS application server for providing the 5GMS service. Then, the processing circuitry can respond to the request with information of the 5GMS application server.

In some examples, the processing circuitry for the 5GMS application function receives the request from a 5GMS application provider in the 5G data network. In some examples, the processing circuitry for the 5GMS application function receives the request from a user device.

In some examples, the processing circuitry for the 5GMS application function can perform functions of edge enabler server to determine the edge application server. In an example, the processing circuitry for the 5GMS application function determines the edge application server based on filtering information in the request, such as needed capabilities, features, and the like.

In another example, the processing circuitry for the 5GMS application function determines the edge application server based on location information of a user device and the location information of the edge application server.

In another example, the processing circuitry for the 5GMS application function can determine the edge application server based on an acknowledgement from the edge application server that is in response to a discovery request from the edge enabler server.

In some examples, the processing circuitry for the 5GMS application function can request the edge application server to instantiate the 5GMS application server, and then can request the 5GMS application server to provide the 5GMS service.

Aspects of the disclosure also provide a non-transitory computer-readable medium storing instructions which when executed by a computer cause the computer to perform the method for media processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
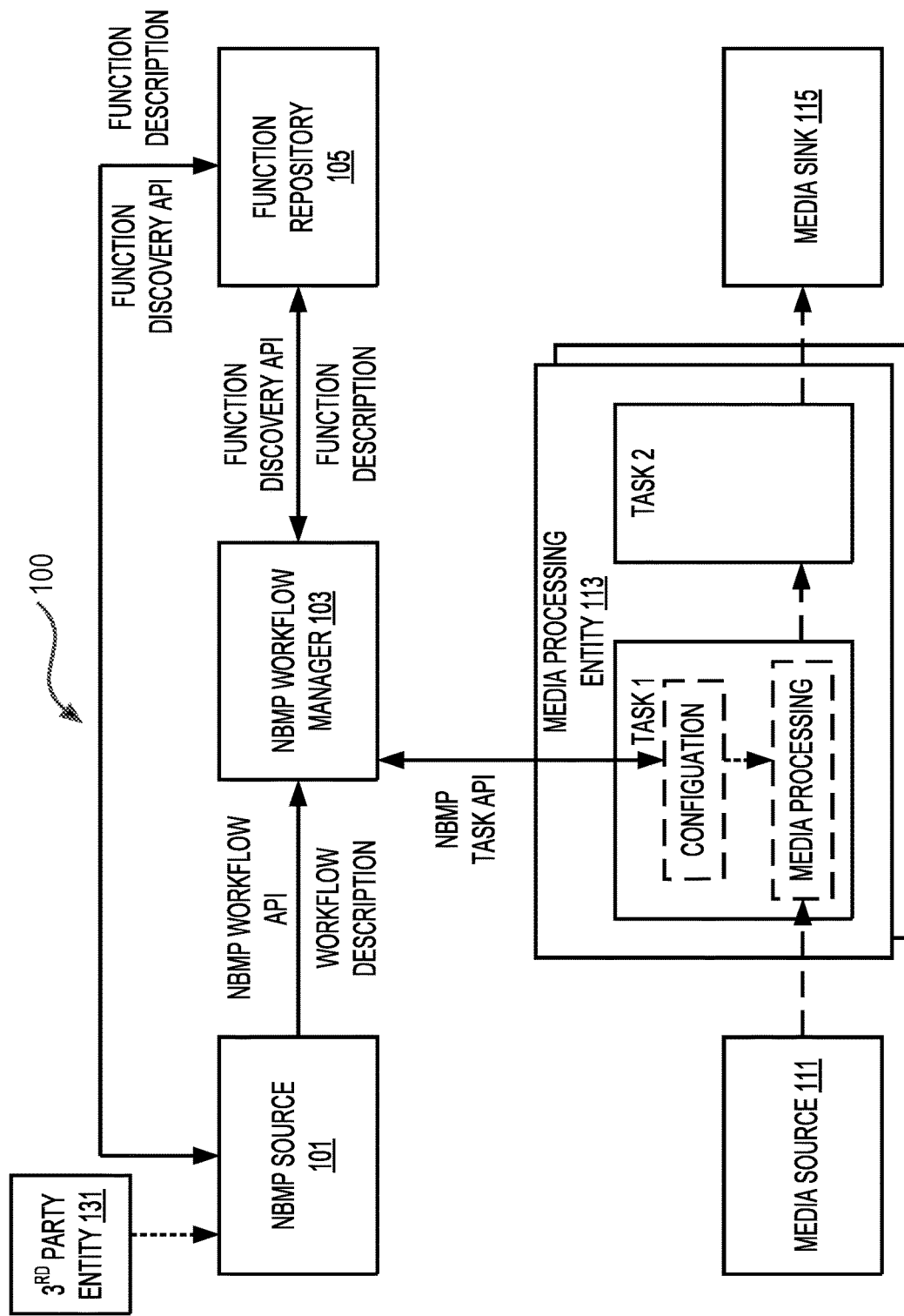
FIG. 1 shows an exemplary media processing system according to an embodiment of the disclosure.

Cloud computing refers to the practice of using a network of remote servers on a network (e.g., the Internet) to deliver information computing services (e.g., cloud services). The network architecture (e.g., including hardware and software) through which the cloud services are provided to service consumers (e.g., clients) is referred to as the cloud. Cloud computing provides access to a wide range of services, such as data processing, media processing, server, storage, network, applications, online services and the like. In some examples, media processing becomes compute intensive, and thus a media processing cloud can be used to offload significant media processing workloads to remote servers.

Generally, a cloud computing system includes a network, one or more servers, and one or more client devices. The network facilitates communications between the servers and client devices. A client device may be, for example, a smartphone, a tablet computer, a laptop, a personal computer, a wearable device, a head-mounted display (HVID), or the like. A server can include any suitable computing or processing device that can provide computing services for one or more client devices. For example, each server can include one or more processing devices, one or more memories storing instructions and data, and one or more network interfaces facilitating communication over the network. In some embodiments, a server includes a workflow manager that can select functions and build a workflow pipeline to perform a processing task.

A media processing system can include various entities, such a workflow manager, a function repository, a media processing entity (MPE), a network based media processing (NBMP) source, and the like that have different functionalities.

In a media processing system, a NBMP source describes the requested media processing and provides information about the nature and format of the media data. Accordingly, an NBMP workflow manager can establish a media processing workflow and informs the NBMP source that the workflow is ready, and then media processing can start. For example, media source(s) can then start transmitting media to the network for processing.

In some embodiments, an NBMP workflow includes media processing tasks that are connected based on input/output relationships among the media processing tasks. Each of the media processing tasks performs a media processing operation, such as video decoding, video stitching, video encoding, and/or the like. In an example, a first media processing task performs a media processing operation based on inputs and generates outputs. The outputs of the first media processing task can be used as inputs to a second media processing task that is connected with the first media processing task. In other words, an NBMP workflow can be considered as a connected graph of media processing tasks.

The workflow manager can ensure the correct operation of the workflow by configuring and monitoring each task as well as the workflow output. In some examples, the workflow manager is configured to the select the media processing functions and instantiate the media processing functions as tasks based on the workflow description that is received from the NBMP source.

In a media processing system, suitable interactions can be performed to establish, load, instantiate and monitor media processing entities that will run the media processing tasks. In some examples, application programming interfaces (APIs) can be defined between an NBMP source and workflow manager; workflow manager and task(s); and an API is defined to discover appropriate function(s). In some examples, a media processing system is configured to be media format and protocol agnostic. The media processing system can identify and signal the media, metadata and auxiliary information formats for data exchanged between media source, the workflow manager and tasks.

In some examples, interfaces including both data formats and application programming interfaces (APIs) among the entities connected through digital networks for media processing can be defined. Users can access and configure user operations remotely for efficient, intelligent processing. The workflows to be applied to media data can be described and managed. The media data can be uploaded to the network, and the media processing tasks can be instantiated and configured. In some embodiments, dynamic creation of media processing pipelines, as well as access to processed media data and metadata in real-time or in a deferred way are enabled. The media and metadata formats used between the media source, workflow manager and media processing entities in a media processing pipeline are also specified.

In an example, clients (e.g., creators, service providers, and consumers of digital media) can describe media processing operations to be performed by media processing entities in a network. A workflow can be described by composing a set of media processing functions that are accessible through interfaces (e.g., NBMP APIs). A media processing entity (MPE) can run processing tasks applied on the media and the related metadata received from media source(s) or other tasks. The MPE can provide capabilities for configuring, managing, and monitoring processing tasks. A media processing task can be a process applied to media and metadata input(s), producing data and related metadata output(s) to be consumed by a media sink or other media processing tasks.

The media processing system can support various delivery methods such as streaming, file delivery, push-based progressive download, hybrid delivery, multipath, and heterogeneous network environments.

FIG. 1 shows an exemplary media processing system (e.g., NBMP system, a NBMP reference architecture, a NBMP architecture) (100) according to an embodiment of the disclosure. The media processing system (100) can include a plurality of entities, such as a NBMP source (101), a workflow manager (e.g., a NBMP workflow manager) (103), a function repository (105), a media source (111), a media processing entity (MPE) (113), a media sink (115), a third party entity, and/or the like. The media processing system (100) can include additional media source(s), media sink(s), and/or media processing entities. The media processing system (100) can process media data across one or more processing entities in a network. Information, such as various media and control information (or control data) for the media, can be communicated among the plurality of entities in the media processing system (100).

To provide a context for discussion purposes, the media processing system (100) is described as the NBMP system (100) below. The descriptions can be suitably adapted to any media processing system.

The NBMP source (101) can describe, or otherwise indicate, media processing in the network. The function repository (105) can include NBMP function descriptions of various NBMP functions. The NBMP source (101) and the workflow manager (103) can retrieve the NBMP function descriptions or functions from the function repository (105). An NBMP function can refer to implementation of a standalone and self-contained media processing operation and/or the corresponding description of the operation.

A processing task or a task can refer to a runtime instance of a NBMP function that is executed by the MPE (113). An NBMP workflow or a workflow can be represented by a graph (e.g., a directed acyclic graph (DAG)) of one or more connected task(s) that achieve the requested media processing. The workflow manager (103) can provision task(s) and connect the task(s) to create, control, manage and monitor a workflow, for example, based on a workflow description document (WDD).

The media source (111) can provide media content (e.g., media data, supplementary information) to be processed by a workflow. The supplementary information can include metadata or auxiliary information related to the media data. The media source (111) can provide an input to the workflow. The media sink (115) can consume an output of the workflow. The MPE (113) can run one or more media processing task(s) to process the media content.

Different entities (e.g., the NBMP Source (101), the workflow manager (103) and the MPE (113)) in the NBMP system (100) can use APIs to invoke and respond to media service requests. The APIs can include a NBMP workflow API or a workflow API, a function discovery API, and a task API. The workflow API can provide an interface between the NBMP Source (101) and the workflow manager (103). The task API can provide an interface between the workflow manager (103) and media processing tasks. The function discovery API can provide an interface between the workflow manager (103)/the NBMP Source (101) and the Function Repository (105).

NBMP interfaces described above can be used to create and control media processing workflows in the network. The NBMP system (100) can be split into a control plane and a media plane (or media data plane). The control plane can include the workflow API, the function discovery API, and the task API.

The workflow API can be used by the NBMP source (101) to create and control a media processing workflow. The NBMP Source (101) can use the workflow API to communicate with the workflow manager (103) for configuring and controlling media processing in the network. When the NBMP Source (101) sends a request to the workflow manager (103) by including a workflow resource (WR) in an operation of the workflow API, the workflow manager (103) can parse the WR, the included WDD and corresponding descriptors, and take the appropriate actions according to the requested operation. Then, the workflow manager (103) can acknowledge the request with a response. The workflow API operations can include creating a workflow (e.g., CreateWorkflow), updating a workflow (e.g., UpdateWorkflow), deleting a workflow (e.g., DeleteWorkflow), retrieving a workflow (e.g., RetrieveWorkflow), and the like.

The function discovery API can provide the means for the workflow manager (103) and/or the NBMP Source (101) to discover media processing functions that can be loaded as part of a media processing workflow.

The task API can be used by the workflow manager (103) to configure and monitor task(s) (e.g., a task 1 and a task 2 run by the MPE (113)) at runtime. The task API can define interface(s) for configuration of media processing tasks by the workflow manager (103), for example, after the resources for the task are allocated in the MPE (113). Task API operations can include creating a task (e.g., CreateTask), updating a task (e.g., UpdateTask), getting a task (e.g., GetTask), deleting a task (e.g., DeleteTask), and the like.

On the media plane, the media formats, the metadata, and the supplementary information formats between the NBMP Source (111) and task(s), as well as between the tasks can be defined.

A workflow description (WD) can be passed from the NBMP source (101) to the workflow manager (103). The WD can describe information such as input data and output data, functions and other requirements for the workflow.

The workflow manager (103) can receive a WDD from the NBMP source (101) and can build a workflow for requested media processing. In a workflow procedure, media processing functions can be selected, for example, from the function repository (105), and then corresponding media processing tasks can be configured and distributed to a set of one or more MPEs (e.g., including the MPE (113)).

The set of functions provided by the function repository (105) can be read by an NBMP source (101) and the workflow manager (103). In an embodiment, the NBMP source (101) requests the creation of a workflow using a set of functions in the function repository (105). Accordingly, the NBMP source (101) is configured to select functions for the workflow. The NBMP source (101) can request the creation of the workflow as described below. The NBMP source (101) can use a description of the media processing tasks by which the workflow is to be created, and can specify a connection map to define connections of inputs and outputs of the media processing tasks. When the workflow manager (103) receives the above information from the NBMP source (101), the workflow manager (103) can instantiate the media processing tasks based on respective function names and can connect the media processing tasks according to the connection map.

Alternatively, the NBMP source (101) can request the creation of a workflow using a set of keywords by which the workflow manager (103) can construct the workflow. Accordingly, the NBMP source (101) may not be aware of a set of functions to be inserted into the workflow. The NBMP source (101) can request the creation of the workflow as described below. The NBMP source (101) can use the set of keywords by which the workflow manager (103) can find the appropriate functions, and can specify the requirements of the workflow using suitable workflow description.

When the workflow manager (103) receives the above information (e.g., the set of keywords) from the NBMP source (101), the workflow manager (103) can create the workflow by searching for appropriate functions using the keywords, for example, specified in a processing descriptor. The workflow manager (103) can then use other descriptors in the workflow description to provision the media processing tasks and connect the media processing tasks to create the final workflow.

A processing model of the workflow manager (103) can be described as below.

The workflow manager (103) can discover available media processing functions as below. The NBMP function repository (105) can provide the function discovery interface (or API) to allow external entities to query for a media processing function that can fulfil the requested processing. The workflow manager (103) can have access to a directory service that offers a searchable list of media processing functions. The workflow manager (103) can use the description of the media processing tasks in the workflow description to find the appropriate functions for the workflow.

Selection of the media processing tasks for the workflow can be described below. When a request for media processing is received from the NBMP source (101), the workflow manager (103) can search the function repository (105) to find the list of all available functions that can fulfill the workflow. Using the workflow description from the NBMP Source (101), the workflow manager (103) can find the functions from the function repository (105) to implement the workflow, which can depend on the information for media processing from the NBMP Source (101). The information for media processing can include the input and output description, the description of the requested processing, and the information in other descriptors for functions in the function directory (105). Mapping of the source requests to appropriate media processing tasks to be included in the workflow can be a part of the implementation of the NBMP in the network. To reference and link input sources with input port names and output port names at the time of task creation, the input-ports and output-ports can be used to make references to the input streams.

A search for appropriate functions to be instantiated as tasks can be performed by the workflow manager (103) using a function discovery API. Alternatively, the workflow manager (103) can retrieve detailed information of some or all suitable functions in the function repository (105) using the function discovery API. The workflow manager (103) can then compare the information for media processing from the NBMP source (101) with different descriptors of each function.

Selected media processing tasks can be configured in the workflow. When the functions to be included in the workflow are identified, the NBMP workflow manager (103) can instantiate the functions as respective tasks and configure the tasks so that the tasks can be added to the workflow. The NBMP workflow manager (103) can extract the configuration data from the media processing information received from the NBMP source (101) and configure the corresponding tasks. The configuration of the tasks can be performed using a task API (e.g., NBMP task API).

Task allocation and distribution can be described below. The workflow manager (103) can use the workflow to perform processing deployment and configure the media processing entities. In an example, for computationally intensive media processing requests, the workflow manager (103) can set up multiple computational instances and distribute a workload among the multiple computational instances. Thus, the workflow manager (103) can connect and configure the multiple computational instances as needed. In an example, the workflow manager (103) allocates a same task to multiple instances and provisions a load balancer to distribute the workload among the multiple instances using a chosen scheduling mechanism. In an alternative example, the workflow manager (103) allocates different operations of the same task to different instances (e.g., parallel operations). In both examples described above, the workflow manager (103) can set up the workflow paths between the instances, and thus the suitable workload can be successfully realized. The workflow manager (103) can configure the tasks to push the processed media data/streams (or make them available through a pull mechanism) to a next task in the workflow graph.

When the workflow manager (103) receives a WDD from the NBMP Source (101), the workflow manager (103) can perform a selection of media processing functions to be inserted into the workflow. When the list of tasks to be included in the workflow is compiled, the workflow manager (103) can then connect the tasks to prepare the workflow.

Figure 2:
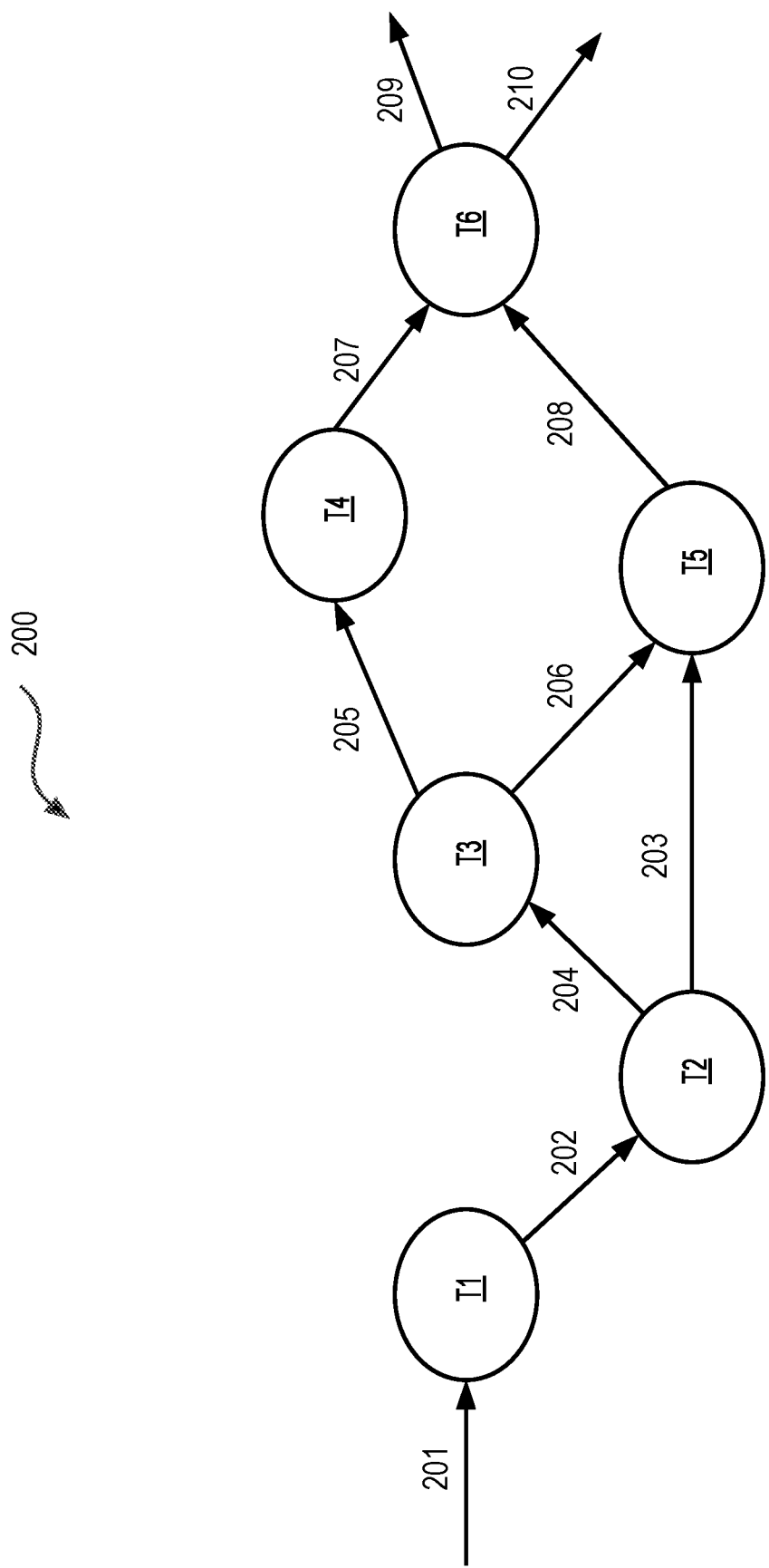
FIG. 2 shows an example of a graph according to an embodiment of the disclosure.

The workflow manager (103) can generate a workflow, for example, as represented by a graph (e.g., a DAG) from the WDD. FIG. 2 shows an example of a graph (e.g., a DAG) (200) according to an embodiment of the disclosure. The DAG (200) can include a plurality of nodes (T1)-(T6) and a plurality of links (or connections) (202)-(208). In an example, the DAG (200) represents the workflow (200).

Each node of the DAG (200) can represent a media processing task in the workflow (200). A link (e.g., the link (202)) connecting a first node (e.g., the node (T1)) to a second node (e.g., the node (T2)) in the DAG (200) can represent a transfer of an output of the first node (e.g., the node (T1)) as an input to the second node (e.g., the node (T2)).

In general, a workflow can include any suitable number of input(s) (or workflow input(s)) and any suitable number of output(s) (or workflow output(s)). The workflow input(s) can be connected to the media source (111), other workflow(s), and/or the like, and the workflow output(s) can be connected to the media sink (115), other workflow(s), and/or the like. The workflow (200) has an input (201) and outputs (209) and (210). The workflow (200) can have one or more outputs from intermediate nodes in some embodiments.

In some examples, media streaming applications can be performed on a cloud platform. For example, 5G media streaming (5GMS) system can support services including mobile network operator (MNO) and third-party downlink or uplink media streaming services. The 5GMS system can provide related network and UE functions and APIs. The 5GMS system can be functionally divided into independent components enabling different deployments with various degrees of integration between 5G MNOs and content providers.

Generally, streaming can be defined as the delivery of time-continuous media content as the predominant media. The media content can be predominantly sent in a single direction and consumed as received. Additionally, the media content of a streaming may be streamed as produced, and the streaming can be referred to as live streaming. If the content of a streaming is already produced, the streaming can be referred to as on-demand streaming.

Figure 3:
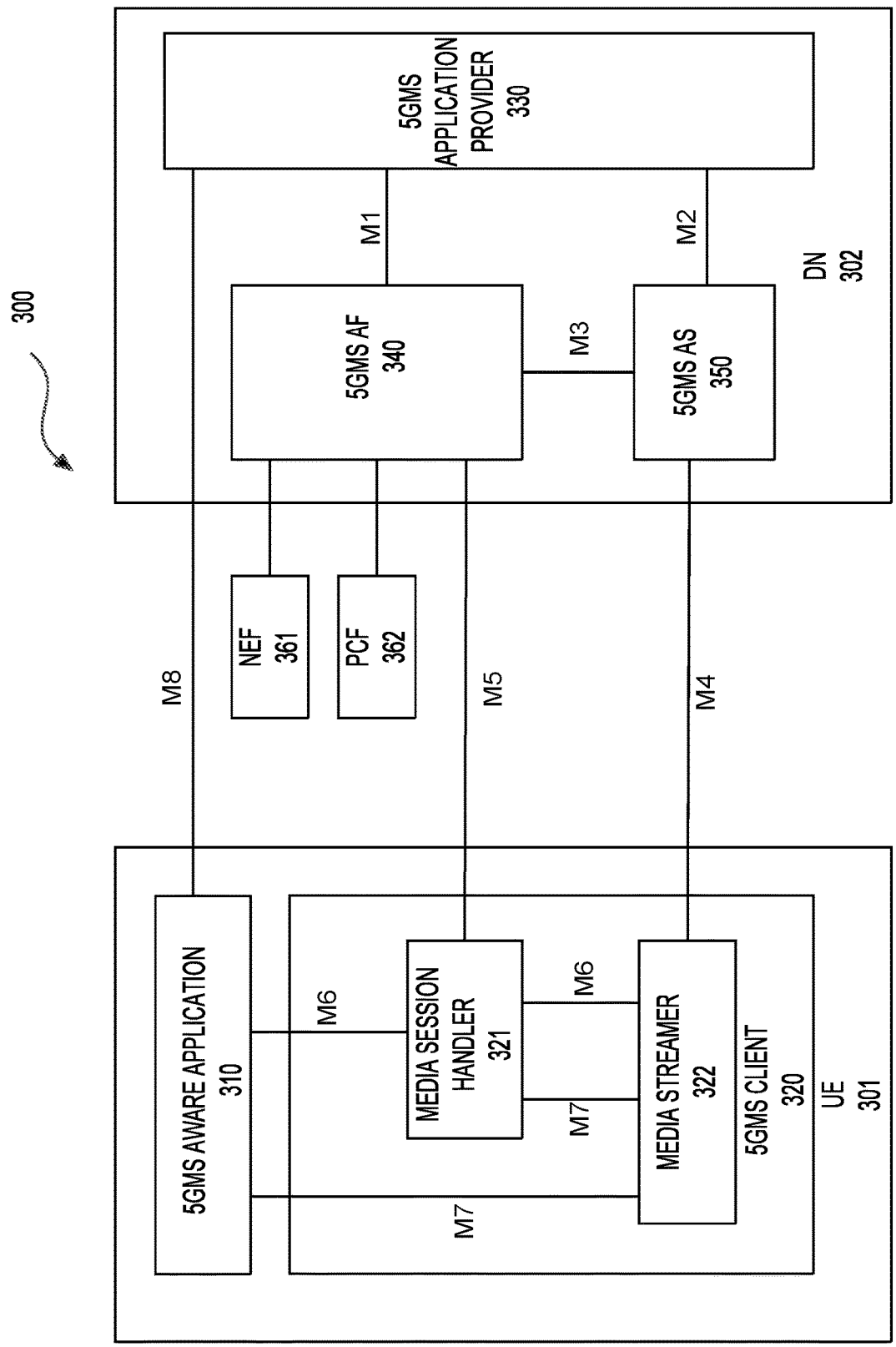
FIG. 3 shows a block diagram of a 5G media streaming (5GMS) system in some examples.

FIG. 3 shows a block diagram of a 5GMS system (300) in some examples. The 5GMS system (300) can include a user equipment (UE) (301) and data network (DN) (302). The 5GMS system (300) can be an assembly of application functions (AFs), application servers (ASs), clients (e.g., UE internal functions), and interfaces that support either downlink media streaming services or uplink media streaming services, or both. For downlink streaming, the DN (302) is an origin of the media, and the UE (301) acts as a consumption device. For uplink streaming, the UE (301) is an origin of the media, and the DN (302) acts as the consumption entity. The components of the 5GMS system (300) may be provided by an MNO as part of a 5GS and/or by a 5GMS application provider.

In some examples, the UE (301) can include a 5GMS aware application (310) and a 5GMS client (320). The 5GMS client (320) can include a media session handler (321) and a media streamer (322). The DN (302) can include a 5GMS application provider (330), a 5GMS application function (AF) (340), and a 5GMS application server (AS) (350). The 5GMS system (300) can further include two 5G functions (e.g., specified by 3GPP 5G standards): a network exposure function (NEF) (361) and a policy control function (PCF) (362). Those elements are coupled together as shown in FIG. 3.

The 5GMS application provider (330) employs the 5GMS system (300) for streaming services. The 5GMS application provider (330) provides or is associated with the 5GMS aware-application (310) on the UE (301) to make use of the 5GMS client (320) and the network functions (340 and 350) using interfaces and APIs defined in the 5GMS system (300). For example, the 5GMS client (320) is typically controlled by the 5GMS aware application (310) (e.g. an app), which implements application or content service provider specific logic and enables a media session to be established. For example, the 5GMS application provider (330) can be an application or content-specific media functionality (e.g., media storage, consumption, transcoding, and redistribution) that uses the 5GMS system (300) to stream media from 5GMS aware applications.

The 5GMS AF (340) can be application functions similar to that defined in 3GPP TS 23.501, "System architecture for the 5G System (5G5)", clause 6.2.10 and dedicated to 5G media streaming. In some examples, the 5GMS AF (340) supports application related control functions that can have influence on traffic routing, accessing network exposure functions (NEF), interaction with policy framework for policy control, and the like. For example, the 5GMS AF (340) can be application function that provides various control functions to the media session handler (321) on the UE and/or to the 5GMS application provider. The 5GMS AF (340) may also relay or initiate a request for different policy or charging function (PCF) treatment or interact with other network functions via the NEF (361). There may be multiple 5GMS AFs present in a deployment and residing within the DN (302), each exposing one or more APIs.

The 5GMS AS (350) can be an application server dedicated to 5G media streaming, such as an application server hosting media functions. In various examples, there may be different realizations of 5GMS ASs, for example, a content delivery network (CDN). The 5GMS AF (340) and 5GMS AS (350) are data network (DN) functions and communicate with the UE (301) via N6 interface as defined in TS 23.501.

The 5GMS client (320) can be a UE internal function dedicated to 5G media streaming.

The 5GMS media streamer (322) can be a UE function that enables uplink delivery of streaming media content to the AS function (350) of the 5GMS application provider (330). The 5GMS media streamer (322) can interact with both the 5GMS aware application (310) for media capture and subsequent streaming, and the media session handler (321) for media session control. For example, the 5GMS media streamer (322) captures a media on the provided input devices. The 5GMS media streamer (322) exposes some basic controls such as capture, pause, and stop to the 5GMS aware application (310). In an example, the 5GMS AF (340) can interact with the NEF (361) for NEF-enabled API access. For example, the 5GMS AF (340) can use the NEF (361) to interact with the PCF (362).

The media session handler (321) can be a function on the UE (301) that communicates with the 5GMS AF (340) to establish, control, and support the delivery of a media session. The Media Session Handler (321) exposes APIs that can be used by the 5GMS aware application (310).

In some examples, the 5GMS system (300) includes various interfaces, such as M1, M2, M3, M4, M5, M6, M7, M8, and the like, and description of the interfaces can be provided as following:

M1 (5GMS Provisioning API): External API, exposed by the 5GMS AF (340) to provision the usage of the 5G media streaming system and to obtain feedback.

M2 (5GMS Publish API): Optional external API exposed by the 5GMS AS (350) used when the 5GMS AS (350) in the trusted DN is selected to receive/host the content for the streaming service.

M3 (Internal): Internal API used to exchange information for content hosting on the 5GMS AS (350) within the trusted DN.

M4 (Media Streaming APIs): APIs exposed by a 5GMS AS (350) to the media streamer (322) to stream media content.

M5 (Media Session Handling API): APIs exposed by the 5GMS AF (340) to the media session handler (321) for media session handling, control and assistance that also include appropriate security mechanisms (e.g. authorization and authentication, and QoE metrics reporting).

M6 (UE Media Session Handling APIs): APIs that may be exposed by the media session handler (321) to the 5GMS aware application to make use of 5GMS functions.

M7 (UE Media Streamer APIs): APIs that may be exposed by the media streamer (322) to the 5GMS aware application (310) and media session handler (321) to make use of the media streamer (322), including the configuration of QoE metrics to be measured and logged, and the collection of metrics measurement logs.

M8 (Application API): application interface used for information exchange between the 5GMS aware application (310) and the 5GMS application provider (330), for example, to provide service access information to the 5GMS aware application.

Figure 4:
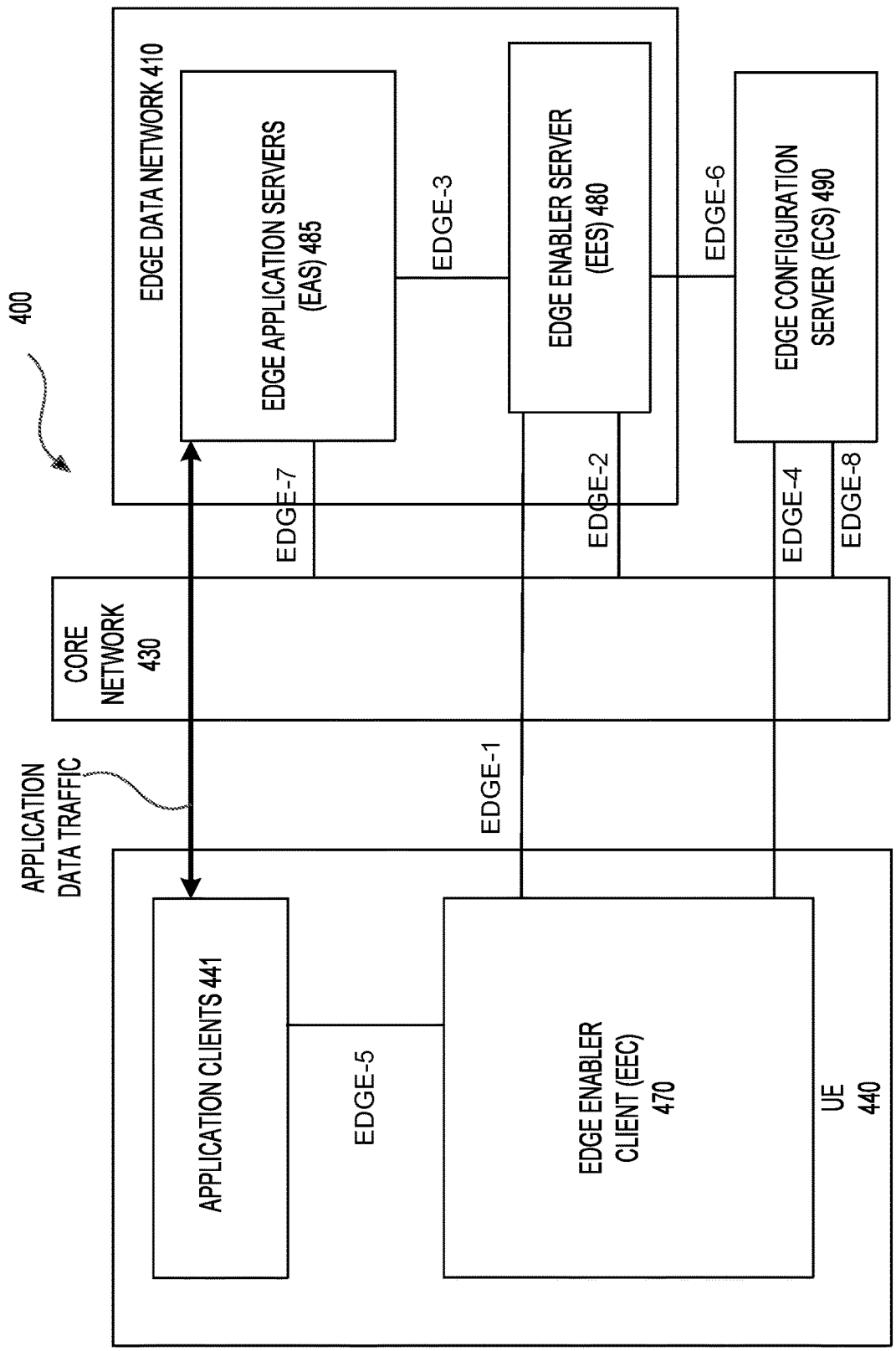
FIG. 4 shows a block diagram of an edge computing system in some examples.

FIG. 4 shows a block diagram of an edge computing system (400) having an architecture for enabling edge applications. The edge computing system (400) includes an edge data network (410), an edge configuration server (490), a core network (430) and UEs, such as shown by UE (440) coupled together as shown in FIG. 4.

In some examples, the edge data network (410) is a local data network. The edge data network (EDN) (410) can include one or more edge application servers (485) and one or more edge enabler servers (480). The edge configuration server (490) can provide configurations related to the edge enabler servers (EES) (480), for example, including details of the edge data network (410) hosting the edge enabler servers (480). The UE (440) can include application client(s) (441) and the edge enabler client (470). The edge application servers (485), the edge enabler servers (480) and the edge configuration server (490) may interact with the core network (430).

The various components in the edge computing system (400) are suitably configured with functions for enabling edge applications.

In some examples, an edge enabler server (480) can provide supporting functions needed for the edge application servers (485) and edge enabler client (470). For example, the edge enabler server (480) can provide configuration information to the edge enabler client (470), and enable exchange of application data traffic with the edge application server(s) (485). Further, the edge enabler server (480) can support the functionalities of API invoker and API exposing function. The edge enabler server (480) can also interact with the core network (430) for accessing the capabilities of network functions either directly (e.g. via PCF) or indirectly (e.g. via service capability exposure function (SCEF)/network exposure function (NEF)/SCEF+NEF). In some examples, the edge enabler server (480) can support the functionalities of application context transfer. Further, the edge enabler server (480) can support external exposure of 3GPP network and service capabilities to the edge application server(s), for example, over EDGE-3 in FIG. 4. In some examples, the edge enabler server (480) can support the functionalities of registration (e.g., registration, update, and de-registration) for the edge enabler client(s) (470) and the edge application server(s) (485). Further, the edge enabler server (480) can support the functionalities of triggering the edge application server (EAS) instantiation on demand.

In some examples, the edge enabler client (EEC) (470) can provide supporting functions needed for the application client(s) (441). In some example, the edge enabler client (EEC) (470) can retrieve and provide configuration information to enable the exchange of application data traffic between the application client(s) (441) with the edge application server (485). Further, the edge enabler client (EEC) (470) can discover edge application servers (485) available in the edge data network (410).

The edge configuration server (ECS) (490) can provide supporting functions needed for the edge enabler client (470) to connect with an edge enabler server (480). In some examples, the edge configuration server (490) can provide edge configuration information to the edge enabler client (470). The edge configuration information can include the information for the edge enabler client (470) to connect to the edge enabler server (480) (e.g., service area information applicable to local area data network (LADN)); and the information for establishing a connection with edge enabler server (480) (such as URI).

It is noted that the edge configuration server (490) can be deployed in the MNO domain or can be deployed in 3rd party domain by a service provider.

The edge configuration server (490) can support the functionalities of registration (i.e., registration, update, and de-registration) for the edge enabler server(s) (480). The edge configuration server (490) can support the functionalities of API invoker and API exposing function. The edge configuration server (490) can interact with the core network (430) for accessing the capabilities of network functions either directly (e.g. via PCF) or indirectly (e.g. via SCEF/ NEF/SCEF+NEF).

An application client (441) can be an application resident in the UE 440 and can perform the client functions.

An edge application server (EAS) (485) is an application server resident in the edge data network (410) and can perform the server functions. In some examples, the application client (441) can connect to the edge application server (485) in order to avail the services of the application with the benefits of edge computing.

In some examples, the server functions of an application are available only at the edge application server(s) (485). In some examples, certain server functions are available both at the edge and in the cloud, such as at the edge application server(s) (485) and other application server, such as application servers (not shown) resident in the cloud respectively. The server functions offered by the edge application server(s) (485) and the cloud application server counterpart may be the same or may differ. If the server functions differ, the application data traffic exchanged with the application client may also be different.

The edge application server(s) (485) may consume the core network capabilities in various ways. In an example, an edge application server (485) may invoke core network function APIs directly when the edge application server (485) is an entity trusted by the core network (430). In another example, an edge application server (485) may invoke core network capabilities through the edge enabler server (480). In another example, an edge application server (485) may invoke the core network capability through the capability exposure functions i.e. SCEF or NEF.

FIG. 4 also shows references points between functional elements in the edge computing system (400), such as reference points EDGE-1, EDGE-2, EDGE-3, EDGE-4, EDGE-5, EDGE-6, EDGE-7, EDGE-8 in FIG. 4.

In some examples, the reference point EDGE-1 may include suitable interface components (such as hardware components, software components) that enable interactions between the EES (480) and the EEC (470). The reference point EDGE-1 can support various functions. In an example, the reference point EDGE-1 is configured to support registration and de-registration of the edge enabler client to the edge enabler server. In another example, the reference point EDGE-1 is configured to support retrieval and provisioning of edge application server configuration information. In another example, the reference point EDGE-1 is configured to support discovery of edge application servers available in the edge data network (410).

In some examples, the reference point EDGE-2 may include suitable interface components (such as hardware components, software components) that enable interactions between the edge enabler server and the core network. In some examples, the reference point EDGE-2 is configured to support access to core network functions and APIs for retrieval of network capability information.

In some examples, the reference point EDGE-3 may include suitable interface components (such as hardware components, software components) that enable interactions between the EES (480) and the EAS (485). In an example, the reference point EDGE-3 is configured to support registration of edge application servers with availability information (e.g. time constraints, location constraints). In another example, the reference point EDGE-3 is configured to support de-registration of edge application servers (485) from the edge enabler server (480). In another example, the reference point EDGE-3 is configured to support discovery of target edge application server information to support application context transfer. In another example, the reference point EDGE-3 is configured to support providing access to network capability information (e.g. location information, QoS related information). In another example, the reference point EDGE-3 is configured to support requesting the setup of a data session between application clients, such as the application clients (441) and EAS (485) with a specific QoS.

In some examples, the reference point EDGE-4 may include suitable interface components (such as hardware components, software components) that enable interactions between the edge configuration server (490) and the edge enabler client (470). In some examples, the reference point EDGE-4 is configured to support provisioning of edge configuration information to the edge enabler client (470).

In some examples, the reference point EDGE-5 may include suitable interface components (such as hardware components, software components) that enable interactions between application client(s) (441) and the edge enabler client (470).

In some examples, the reference point EDGE-6 may include suitable interface components (such as hardware components, software components) that enable interactions between the edge configuration server (490) and the edge enabler server (480). In some examples, the reference point EDGE-6 is configured to support registration of edge enabler server information to the edge configuration server (490).

In some examples, the reference point EDGE-7 may include suitable interface components (such as hardware components, software components) that enable interactions between the edge application server (485) and the core network (430). In some examples, the reference point EDGE-7 is configured to support access to core network functions and APIs for retrieval of network capability information.

In some examples, the reference point EDGE-8 may include suitable interface components (such as hardware components, software components) that enable interactions between the edge configuration server (490) and the core network (430). In some examples, the reference point EDGE-8 is configured to support access to core network functions and APIs for retrieval of network capability information.

Some aspects of the disclosure provide a media streaming system with edge computing capabilities.

Figure 5:
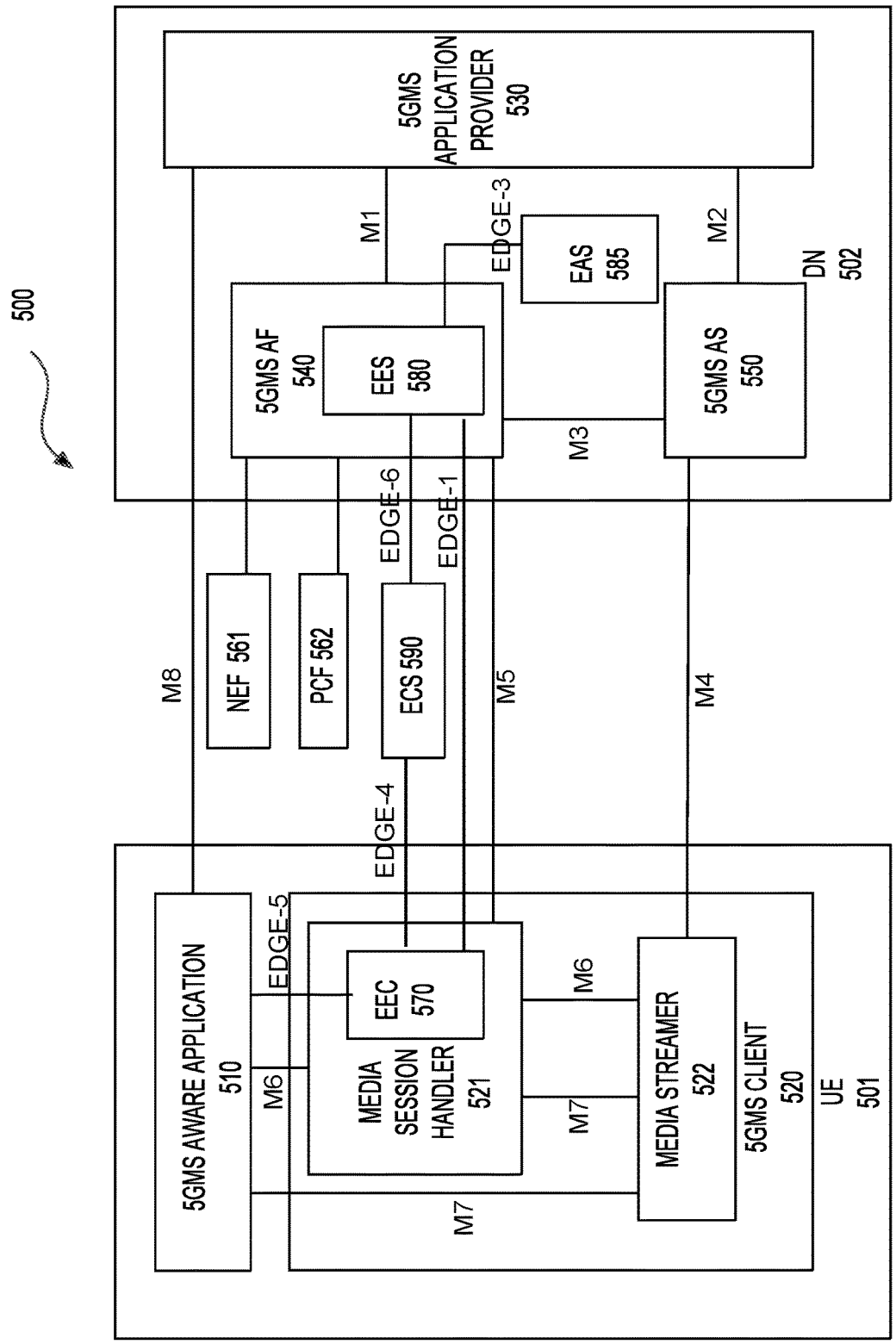
FIG. 5 shows a block diagram of an edge enabled media streaming system according to some embodiments of the disclosure.

FIG. 5 shows a block diagram of an edge enabled media streaming system (500) according to some embodiments of the disclosure. The edge enabled media streaming system (500) includes components that are similarly configured as components in the 5GMS system (300) and the components in the edge computing system (400). For example, the 5GMS aware application (510) is equivalent to the 5GMS aware application (310); the media session handler (521) is equivalent to the media session handler (321); the media streamer (522) is equivalent to the media streamer (322); the 5GMS client (520) is equivalent to 5GMS client (320); the 5GMS AF (540) is equivalent to 5GMS AF(340); the 5GMS AS (550) is equivalent to 5GMS AS (350); the 5GMS application provider (530) is equivalent to the 5GMS application provider (530); the NEF (561) is equivalent to the NEF (361); the PCF (562) is equivalent to the PCF (362); the EEC (570) is equivalent to the EEC (470); the EES (580) is equivalent to the EES (480); the EAS (585) is equivalent to the EAS (485); the ECS (590) is equivalent to the ECS (490); the DN (502) is equivalent to the DN (302), and also includes edge data network; the M1 to M8 in FIG. 5 are respectively equivalent to the M1-M8 in FIG. 3; EDGE-1, EDGE-3 to EDGE-6 in FIG. 5 are respectively equivalent to EDGE-1, EDGE-3 to EDGE-6 in FIG. 4. The description of these components has been provided above and will be omitted here for clarity purposes.

In the FIG. 5 example, EES (580) can discover multiple EASs (585), and the EASs (585) are considered as separate entities from 5GMS AS (550). In some examples, an EAS (585) can instantiate a 5GMS AS (550). The 5GMS AF (540) includes functionalities of edge enabler server, for example, the 5GMS AF (540) can include the EES (580). The 5GMS AF (540) can use the EES (580) to discover and select an EAS (585). The EAS (585) can instantiate 5GMS AS (550). Then, the 5GMS AS (550) can run the processing on the corresponding hardware defined by EES (580).

Further in FIG. 5, in some examples, since the 5GMS AF (540) includes the EES (580), then the 5GMS AF (540) can support EDGE-2 as part of EES (580).

In some examples, the EAS (585) can support EDGE-7. In some examples, EDGE-3 can be configured to provide media processing support.

In some examples, M1 can be configured to include additional information. In an example, the 5GMS AF (540) can use M1 to indicate the support of edge enabler servers (EESs) and the edge application servers (EASs) to the 5GMS application provider 530, and thus inform the 5GMS application provider 530 that the data network (502) is edge enabled. In another example, the M1 can expose the relevant additional information of the EESs (580) to the 5GMS application provider (530). For example, the additional information can indicate the current availability of the EESs (580).

In some examples, M6 can be configured to include additional information. In an example, the media session handler (521) can use M6 to indicate that the media session handler (521) supports functionalities of EEC, for example, the media session handler (521) includes the EEC (570). In another example, M6 is configured to include information of the EDGE-5, such as address of EDGE-5 and the like.

Figure 6:
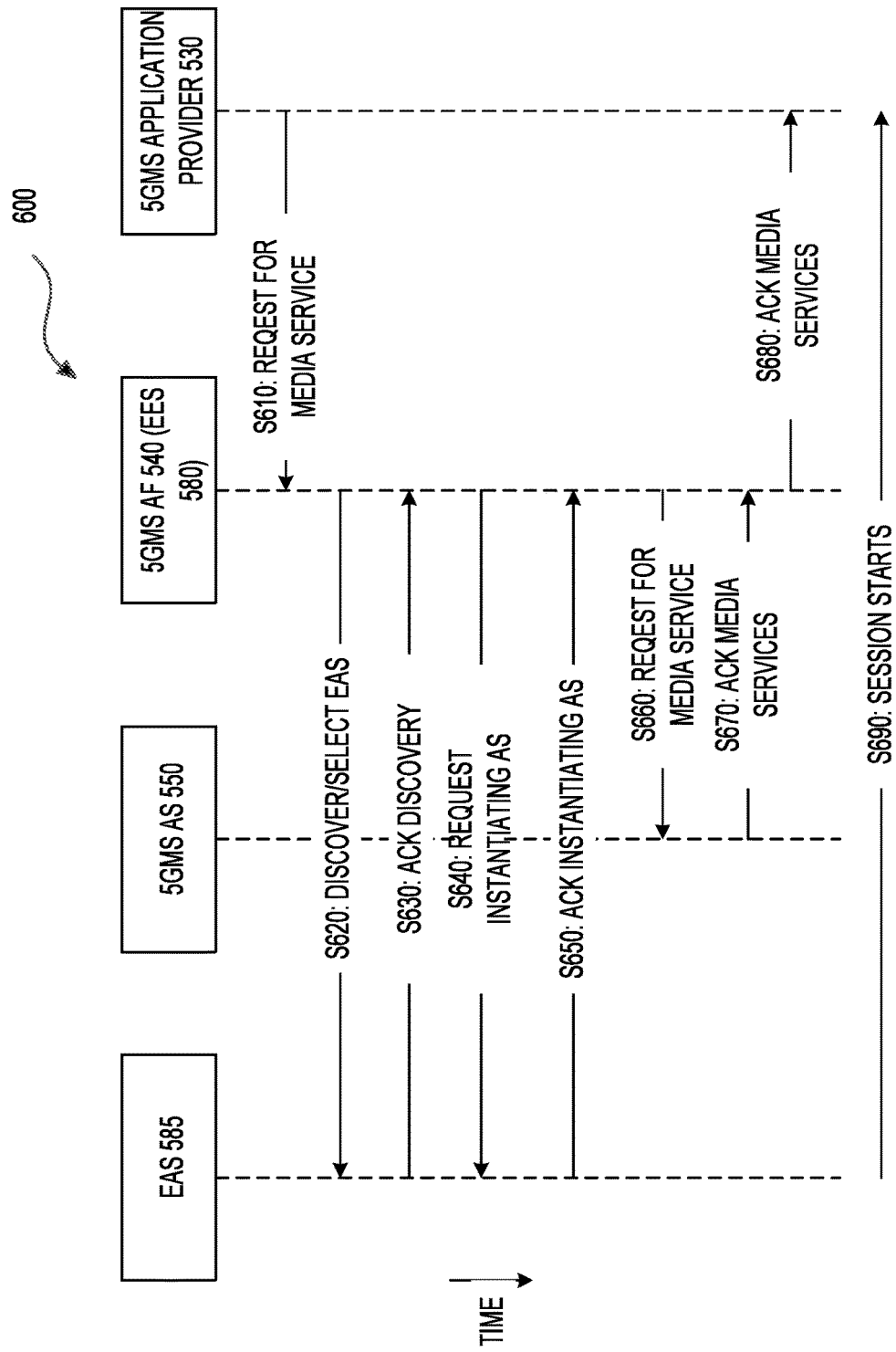
FIG. 6 shows a diagram illustrating a process flow for running media services according to some embodiments of the disclosure.

FIG. 6 shows a diagram illustrating a process flow (600) for running media services in the edge enabled media streaming system (500) according to some embodiments of the disclosure. In the FIG. 6 example, a media service is requested by the 5GMS application provider (530).

At (S610), the 5GMS application provider (530) sends a request to the 5GMS AF (540) and requests provisioning of a specific media service from the 5GMS AF (540). In some examples, the 5GMS application provider (530) sends the request to the 5GMS AF (540). The request can include the used features, capabilities and detailed configurations for the specific media service. In an example, the request can include information that can be used to determine a location of a user device.

At (S620), the 5GMS AF (540) can discover available EASs (585) through functionalities of edge enabler server. For example, the 5GMS AF (540) includes the EES (580), and the EES (580) can send discovery request to EASs (585) to discover available EASs (585). In some examples, the discovery request can include the location of the user device. In an example, the location of the user device is from the request. In another example, the EES (580) can detect the location of the user device, for example from 3GPP system.

At (S630), available EASs (585) can respectively respond to the discovery request with a discovery acknowledgement to the EES (580). A discovery acknowledgement from an available EAS (585) can include information of the available EAS (585). The EES (580) and the 5GMS AF (540) can receive the information of the available EASs (585).

At (S640), the 5GMS AF (540) can select one of the available EASs (585) and send a request to the selected EAS (585) to instantiate an application server, such as the 5GMS AS (550) for providing the specific media service. It is noted that, in some examples, the steps (S620)-(S630) can be optional, the EES (580) includes information of EASs (585) that is previously stored, and can determine available EASs (585) and select one of the available EASs(585) according to previously stored information of the EASs (585), such as capabilities, location, and other suitable information of the EASs (585).

At (S650), the EAS (585) can instantiate an application server, and can send an acknowledgement for the instantiated application server. The acknowledgement can include information of the instantiated application server that is referred to as 5GMS AS (550).

At (S660), based on the information of the 5GMS AS (550), the 5GMS AF (540) can send a request to the 5GMS AS (550) to run the specific media service.

At (S670), the 5GMS AS (550) runs the specific media service and sends an acknowledgement to the 5GMS AF (540) to confirm.

At (S680), the 5GMS AF (540) can send an acknowledgement to the 5GMS application provider (530) to acknowledge that the media service is running.

At (S690), a media streaming session starts.

Figure 7:
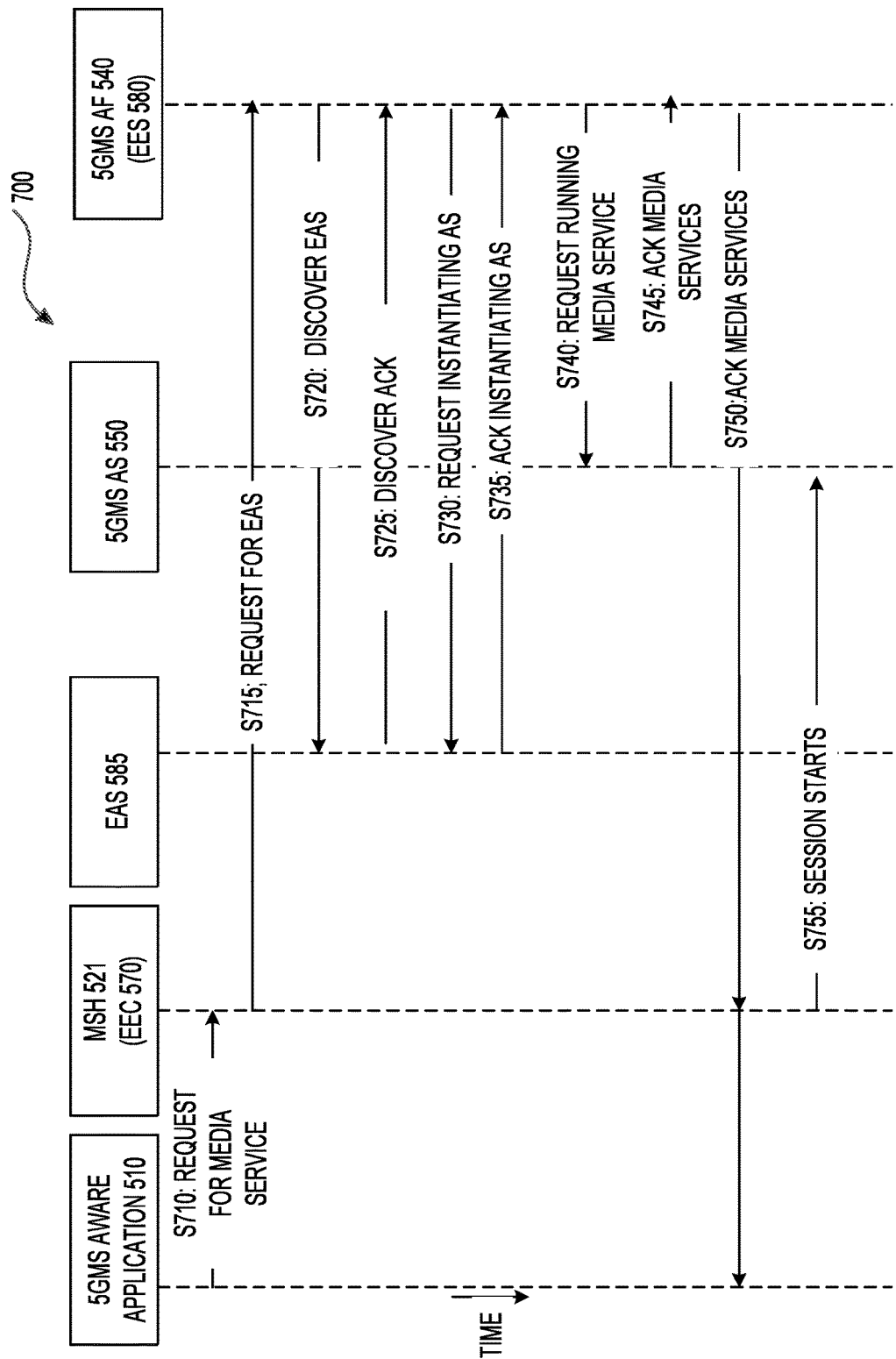
FIG. 7 shows another diagram illustrating a process flow for running media services according to some embodiments of the disclosure.

FIG. 7 shows a diagram illustrating a process flow (700) for running media services in the edge enabled media streaming system (500) according to some embodiments of the disclosure. In FIG. 7, a media service is requested by the 5GMS aware application (510).

At (S710), the 5GMS aware application (510) can sent a request to the media session handler (MSH) (521) to request provisioning of a specific media service.

At (S715), the MSH (521) can, through the EEC (570), send a request to 5GMS AF (540) for the specific media service. For example, the request is sent from EEC (570) to the EES (580) by EDGE-1. The request includes information of the UE (501), such as location of the UE (501), EAS discovery filters (e.g., capabilities), a category of ESAs (e.g., gaming applications and like), and the like.

At (S720), the 5GMS AF (540) can discover available EAS's. For example, the EES (580) in the 5GMS AF (540) can send out discovery requests. For example, the EES (580) can send discovery requests to EASs (585) to discover available EASs (585). In some examples, a discovery request can include the location of the UE (501). In an example, the location of the UE (501) is received from the EEC (570). In another example, the EES (580) can detect the location of the UE (501), for example from 3GPP system.

At (S725), available EASs (585) can respectively respond to the discovery request with a discovery acknowledgement to the EES (580). A discovery acknowledgement from an available EAS (585) can include information of the available EAS (585). The EES (580) and the SGMS AF (540) can receive the information of the available EASs (585).

At (S730),), the SGMS AF (540) can select one of the available EASs (585) and send a request to the selected EAS (585) to instantiate an application server, such as the SGMS AS (550) for providing the specific media service. It is noted that, in some examples, the steps (S720)-(S725) can be optional, the EES (580) includes information of EASs (585) that is previously stored, and can determine available EASs (585) and select one of the available EASs(585) based on previously stored information of the EASs (585).

At (S735), the EAS (585) can instantiate an application server, and can send an acknowledgement for the instantiated application server. The acknowledgement can include information of the instantiated application server that is referred to as SGMS AS (550).

At (S740), based on the information of the SGMS AS (550), the SGMS AF (540) can send a request to the SGMS AS (550) to run the specific media service.

At (S745), the SGMS AS (550) runs the specific media service and sends an acknowledgement to the SGMS AF (540) to confirm.

At (S750), the SGMS AF (540) can send an acknowledgement of the media service to the MSH (521), and then the MSH (521) can send an acknowledgement of the media service to the SGMS aware application (510).

At (S755), the media streaming session starts.

As shown in FIG. 5-FIG. 7, the edge enabled media streaming system (500) can use some existing application programming interfaces in the SGMS system and edge computing system for running media services on the edge network. In addition, some application programming interfaces, such as M1, M6, EDGE-3, and the like are extended to support additional information needed to leverage the edge computing. The capability of discovering various edge application servers and selection of one of the edge application servers can be based on the capabilities, location, and possibly other information. Further, the media services can be requested by an application on user device or by application (service) provider.

Figure 8:
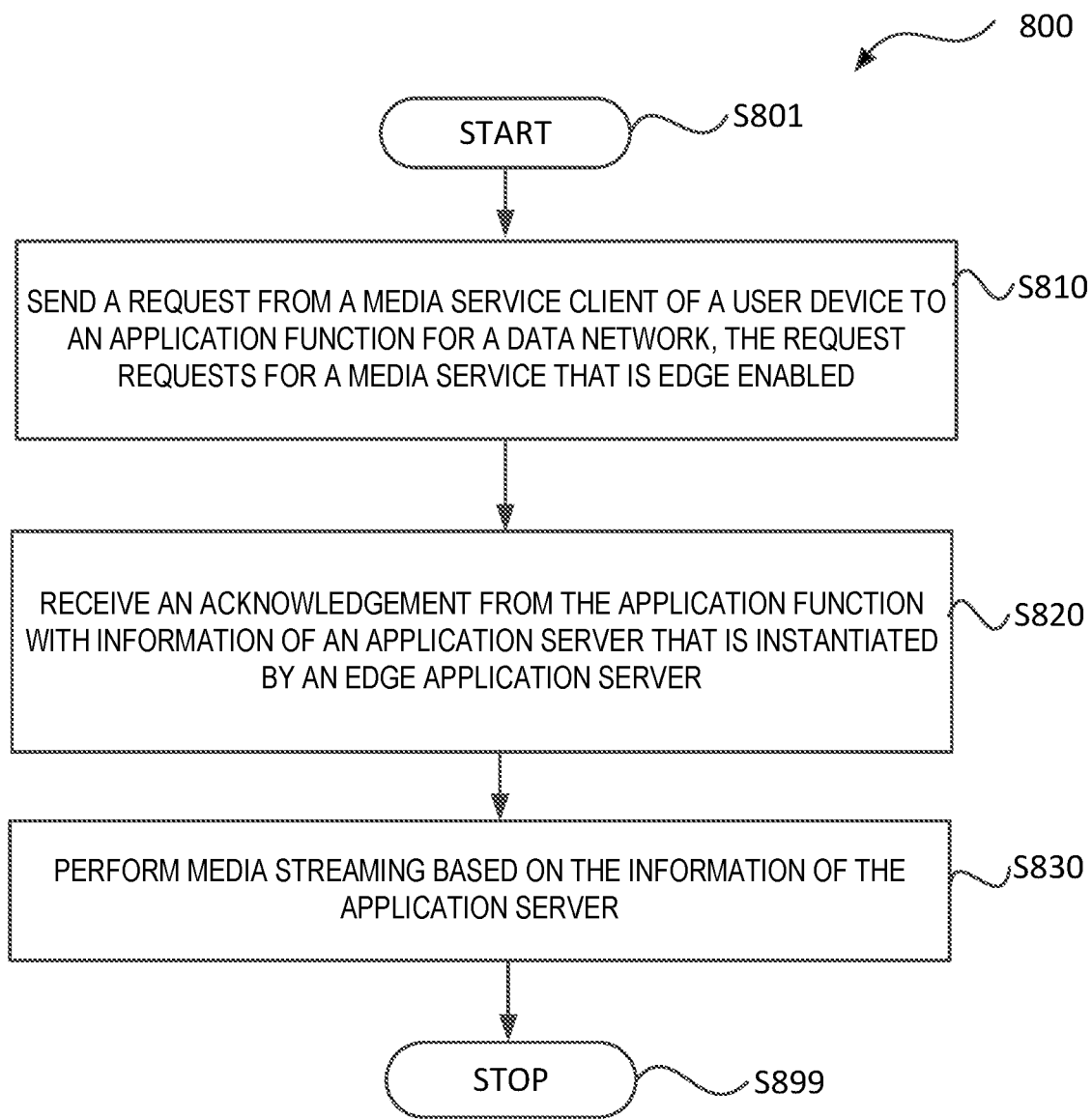
FIG. 8 shows a flow chart outlining a process example according to some embodiments of the disclosure.

FIG. 8 shows a flow chart outlining a process (800) according to an embodiment of the disclosure. In an example, the process (800) is executed by processing circuitry of a user device, such as the UE (501) in the edge enabled media streaming system (500). In some embodiments, the process (800) is implemented in software instructions, thus when the processing circuitry executes the software instructions, the processing circuitry performs the process (800). The process starts at (S801) and proceeds to (S810).

At (S810), a request is sent from a media service client of the user device to an application function for a data network. The request can request for a media service that is edge enabled.

In an example, request is sent by the media service client in response to a media request by a media application in the user device.

In some examples, the request is sent via an interface of an edge enabler client of the media service client with an edge enabler server of the application function.

At (S820), an acknowledgement is received from the application function with information of an application server that is instantiated by an edge application server.

In some examples, the edge application server is determined by the edge enabler server. In an example, the edge enabler server determines the edge application server based on filtering information, such as type of media stream, capability requirement, feature requirement and the like, in the request. In another example, the edge enabler server determines the edge application server based on location information of the user device and the location of the edge application server. In another example, the edge enabler server determines the edge application server based on an acknowledgement from the edge application server that is in response to a discover request from the edge enabler server.

In some examples, the application function requests the edge application server to instantiate the application server and request the application server to provide the media service.

At (S830), media streaming is performed based on the information of the application server. Then, the process proceeds to (S899) and terminates.

The process (800) can be suitably adapted. Step(s) in the process (800) can be modified and/or omitted. Additional step(s) can be added. Any suitable order of implementation can be used.

Figure 9:
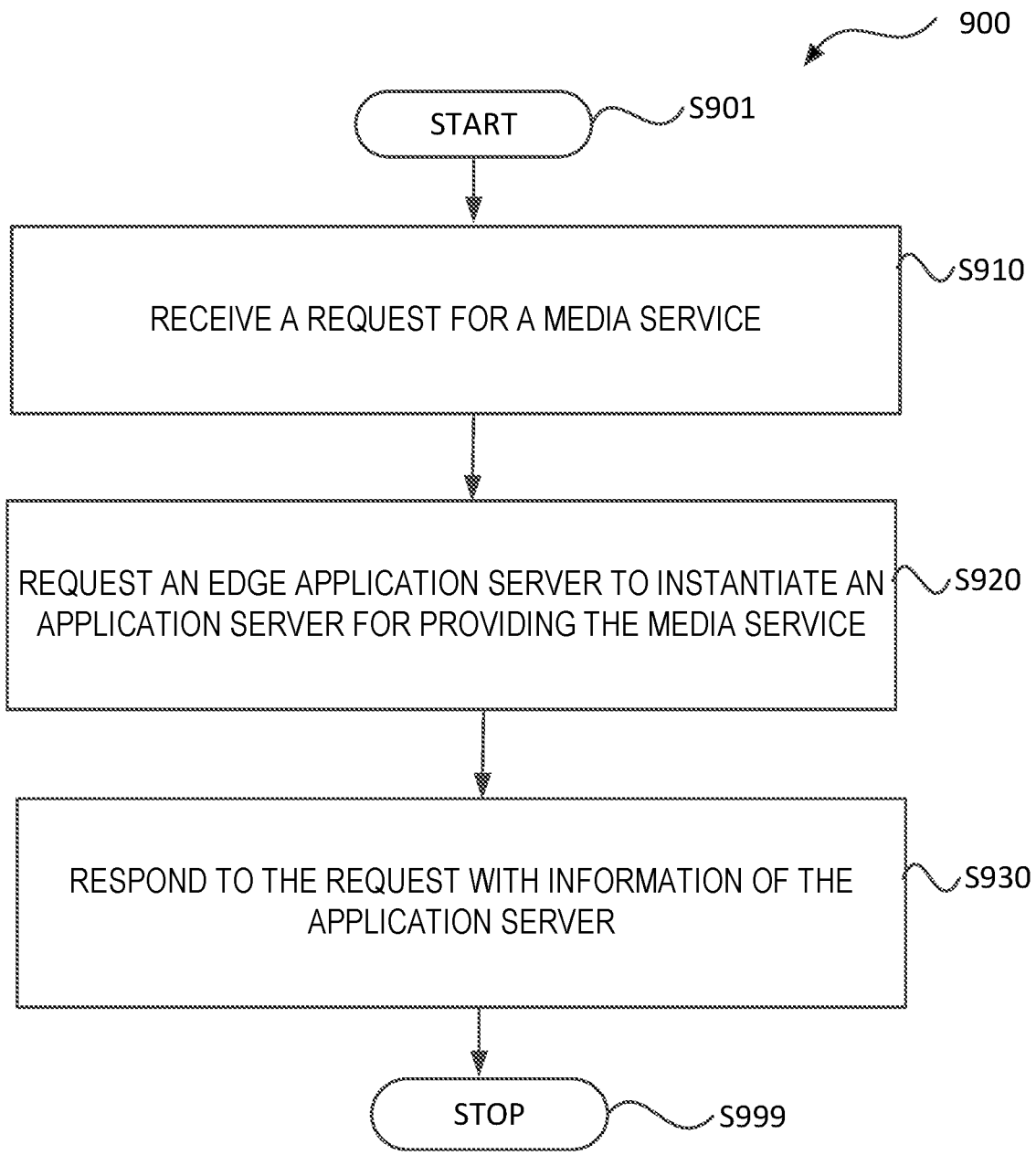
FIG. 9 shows a flow chart outlining a process example according to some embodiments of the disclosure.

FIG. 9 shows a flow chart outlining a process (900) according to an embodiment of the disclosure. In an example, the process (900) is executed by processing circuitry of an application function entity in a cloud, such as the 5GMS AF (540) in the edge enabled media streaming system (500). In some embodiments, the process (900) is implemented in software instructions, thus when the processing circuitry executes the software instructions, the processing circuitry performs the process (900). The process starts at (S901) and proceeds to (S910).

At (S910), an application function for a data network receives a request for a media service. In some examples, the request is from an application provider in the data network, such as the process flow (600) in FIG. 6. In some examples, the request is from a user device, such as the process flow (700) in FIG. 7.

At (S920), the application function requests an edge application server to instantiate an application server for providing the media service. In some examples, an edge enabler server in the application function determines the edge application server. In an example, the edge enabler server in the application function determines the edge application server based on filtering information, such as type of media stream, capability requirement, feature requirement and the like, in the request. In another example, the edge enabler server in the application function determines the edge application server based on location information of a user device, and a location of the edge application server. In another example, the edge enabler server in the application function determines the edge application server based on an acknowledgement from the edge application server that is in response to a discovery request from the edge enabler server.

In some examples, the application function requests the edge application server to instantiate the application server. Further, the application function requests the application server to provide the media service.

At (S930), the application function responds to the request with information of the application server. Then, the process proceeds to (S999) and terminates.

The process (900) can be suitably adapted. Step(s) in the process (900) can be modified and/or omitted. Additional step(s) can be added. Any suitable order of implementation can be used.

The techniques described above, can be implemented as computer software using computer-readable instructions and physically stored in one or more computer-readable media.

The methods and embodiments in the disclosure may be used separately or combined in any order. Further, each of the methods (or embodiments), functions or tasks, may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
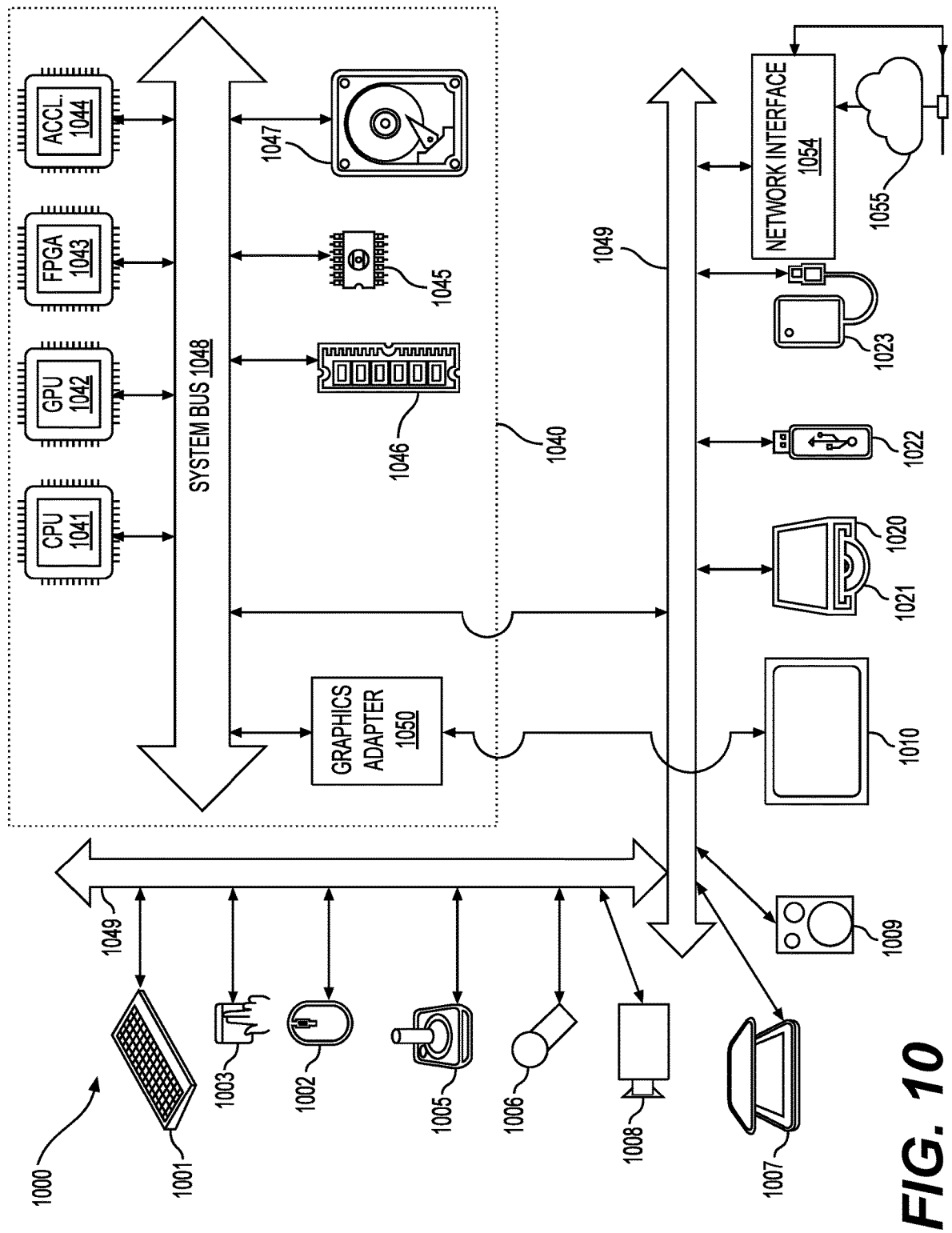
FIG. 10 is a schematic illustration of a computer system in accordance with an embodiment.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can be also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for 5G media streaming at a user device, comprising:
    sending a request from a 5G media streaming (5GMS) service client of the user device to a 5GMS application function of a 5G data network, the request including edge application server filtering information and requesting a 5G media streaming (5GMS) service;
    receiving an acknowledgement from the 5GMS application function with information of an 5GMS application server that is instantiated by an edge application server, wherein the edge application server is selected based on the edge application server filtering information included in the sent request; and
    performing the 5G media streaming based on the information of the 5GMS application server.

2. The method of claim 1, further comprising:
    sending the request in response to a media request from a 5GMS aware application in the user device.

3. The method of claim 1, further comprising:
    sending the request via an interface of an edge enabler client of the 5GMS service client to an edge enabler server in the 5GMS application function.

4. The method of claim 3, wherein the edge application server is selected by the edge enabler server.

5. The method of claim 4, wherein the edge enabler server selects the edge application server further based on a location of the user device and a location of the edge application server.

6. The method of claim 4, wherein the edge enabler server selects the edge application server further based on an acknowledgement from the edge application server that is in response to a discovery request from the edge enabler server.

7. The method of claim 4, wherein the 5GMS application function requests the edge application server to instantiate the 5GMS application server and request the 5GMS application server to provide the 5GMS service.

8. A method for 5G media streaming (5GMS), comprising:
- receiving, by a 5GMS application function for a 5G data network, a request for a 5GMS service, the request including edge application server filtering information;
- selecting an edge application server based on the edge application server filtering information included in the received request;
- requesting, by the 5GMS application function, the selected edge application server to instantiate a 5GMS application server for providing the 5GMS service; and
- responding, by the 5GMS application function, to the request with information of the 5GMS application server.

9. The method of claim 8, wherein the request is from a 5GMS application provider in the 5G data network.

10. The method of claim 8, wherein the request is from a user device.

11. The method of claim 8, wherein
the edge application server is selected by an edge enabler server in the 5GMS application function.

12. The method of claim 11, wherein
the edge application server is selected by the edge enabler server in the 5GMS application function further based on location information of a user device and a location of the edge application server.

13. The method of claim 11, wherein
the edge application server is selected by the edge enabler server in the 5GMS application function further based on an acknowledgement from the edge application server that is in response to a discovery request from the edge enabler server.

14. The method of claim 11, further comprising:
requesting, by the 5GMS application function, the edge application server to instantiate the 5GMS application server.

15. The method of claim 14, further comprising:
requesting, by the 5GMS application function, the 5GMS application server to provide the 5GMS service.

16. An apparatus, comprising:
processing circuitry configured to:
- send a request from a 5G media streaming (5GMS) service client of the apparatus to a 5GMS application function of a 5G data network, the request including edge application server filtering information and requesting a 5GMS service;
- receive, an acknowledgement from the 5GMS application function with information of a 5GMS application server that is instantiated by an edge application server, wherein the edge application server is selected based on the edge application server filtering information included in the sent request; and
- perform 5G media streaming based on the information of the 5GMS application server.

17. The apparatus of claim 16, wherein the processing circuitry is configured to:
send the request in response to a media request from a 5GMS aware application running in the apparatus.

18. The apparatus of claim 16, wherein the processing circuitry is configured to:
send the request via an interface of an edge enabler client of the 5GMS service client to an edge enabler server in the 5GMS application function.

19. The method of claim 1, wherein the edge application server filtering information comprises at least one of (i) a type of media stream provided by the 5GMS service or (ii) capability requirements for selection of the edge application server.

* * * * *